United States Patent [19]

Tobe

[11] 4,258,558

[45] Mar. 31, 1981

[54] SAVING APPARATUS FOR PROGRAM SHEET IN AUTOMATIC CONTROL SYSTEM OF FLAT KNITTING MACHINE

[75] Inventor: Hideharu Tobe, Tokyo, Japan

[73] Assignee: Heiko Seisakusho, Ltd., Tokyo, Japan

[21] Appl. No.: 19,431

[22] Filed: Mar. 12, 1979

[30] Foreign Application Priority Data

Mar. 15, 1978 [JP] Japan .................................. 53-29523

[51] Int. Cl.³ ...................... D04B 15/00; D04B 15/66
[52] U.S. Cl. ......................................... 66/237; 66/232
[58] Field of Search ................ 66/231, 232, 237, 75.2, 66/233, 235

[56] References Cited

U.S. PATENT DOCUMENTS

| | | | |
|---|---|---|---|
| 2,395,823 | 3/1948 | Hayhurst ................................ 60/233 |
| 3,141,316 | 7/1964 | McCarthy et al. ................... 66/89 X |
| 3,196,403 | 7/1965 | Ivins ....................................... 66/233 |
| 3,439,513 | 4/1969 | Hill et al. ........................... 66/232 X |
| 4,105,157 | 8/1978 | Kagaya .............................. 66/232 X |

*Primary Examiner*—Ronald Feldbaum
*Attorney, Agent, or Firm*—Whittemore, Hulbert & Belknap

[57] ABSTRACT

Operation conditions of a knitting machine for respective courses are marked on predetermined columns of a program sheet and are thus stored, the program sheet is rotated in the normal direction or reverse direction by one pitch per course, and marks are read out at every step of the program sheet by a mark reader to operate the knitting machine under conditions indicated by the read marks. In the apparatus for saving instuctions of a program sheet according to the present invention, when the operation of a knitting machine is continuously conducted under the same conditions, the stepwise advance of the program sheet is stopped and when the operation of the knitting machine is repeated according to a certain operation cycle, the program sheet is rotated in the normal direction or reverse direction according to said operation cycle.

4 Claims, 5 Drawing Figures

SAVING APPARATUS FOR PROGRAM SHEET IN AUTOMATIC CONTROL SYSTEM OF FLAT KNITTING MACHINE

BACKGROUND OF THE INVENTION

In the conventional apparatus for saving operation instructions, which is used when cam operations and other operations are conducted in a knitting machine, there is adopted a card control system, which is one of mechanical systems. According to this system, a disc for counting cycles of the card is used in addition to the control card, and counting of the cycles is controlled based on the position of a pin on this disc. According to this system, the kinds of the cycles are limited, and in order to increase the kinds of the cycles, it is necessary to increase the length of the control card. There is also adopted an electric control system in which according to the frequency of operation instructing signals to be saved, that is, when it is desired to save many kinds of instructions, preset counters are used in a number corresponding to the number of the kinds of instructions to be saved, and marks are formed on a program sheet on mark columns corresponding to the respective preset counters to perform saving of instructions of a specific frequency. This electric control system is defective in that if it is desired to save a variety of instructions differing in the preset quantity, it is necessary to increase the number of counters or to prolong a chain or sheet according to the kinds of instructions to be saved.

SUMMARY OF THE INVENTION

The present invention relates to a saving apparatus for a program sheet for driving and operating a knitting machine. More particularly, the invention relates to a saving apparatus for a program sheet, in which operation conditions of a knitting machine for respective courses are marked on predetermined columns of the program sheet and are thus stored, the program sheet is advanced by one pitch per course and marks are read out at every step of the program sheet by a mark reader.

More specifically, according to the saving apparatus of the present invention, a plurality of basic saving frequencies are selected, optional saving frequencies can be set on a program sheet by combining these basic saving frequencies appropriately, and since signals of this setting are used in common with saving count input signals, it is not necessary to form a particular signal for start of the counting and the number of regions where saving frequencies are set can be increased to the limit of the length of the program sheet.

According to the present invention, the saving cycle is formed to avoid repetition of the stepwise advance of the program sheet, and another saving cycle can be formed within said saving cycle.

Furthermore, according to the present invention, there is provided an apparatus for saving instructions of a program sheet for operation of a knitting machine, in which while the knitting machine is continuously operated under the same conditions, it is made possible to interrupt repetition of the operation and perform the knitting operation according to marks formed on the subsequent address of the program sheet.

In the saving apparatus of the first embodiment of the present invention, a plurality of saving frequency setting columns differing in the determined saving frequency are optionally selected and combined and marks are formed on these columns, whereby it is made possible to set optional saving frequencies. In this embodiment, four kinds of frequencies of one time, 2 times, 4 times and 8 times are set as basic standard frequencies, and by selecting and combining these basic standard frequencies appropriately, there can be obtained saving frequencies of up to 15 times can be obtained. If the kinds of such basic saving frequencies is increased to 5 or more, it is possible to obtain saving frequencies of 16 times or more. Further, when marks for normal rotation or marks for reverse rotations are formed, the program sheet can be moved reciprocatively according to a cycle between appropriate two addresses, and therefore, this apparatus is effective when the same operation is conducted repeatedly. Moreover, since the saving frequency can be directly marked and stored in the program sheet of this saving apparatus, it is not necessary to dispose means for storing the saving frequency in addition to the program sheet.

Still further, in this saving apparatus, if the saving frequency is set without formation of marks for normal rotation or reverse rotation, the stalemate state can be maintained till the saving frequency marked on the saving frequency setting column is reached, and this can be attained in a continuous manner. Therefore, the program sheet need not be prolonged as in the conventional system, and a very short program sheet can be used.

According to another embodiment of the present invention, there is provided an apparatus for saving instructions for operation of a flat knitting machine by using two preset counter circuits, wherein different saving frequencies are set on addresses on the normal rotation and reverse rotation sides of a saving loop while using one common frequency setting column so that these different saving frequencies are counted by preset counters, and one preset counter is arranged to have a function of maintaining the stalemate state till the saving frequency set without formation of a mark of instructions of normal or reverse rotation is reached and the second preset counter is arranged to have a function of performing operations set on the program sheet such as normal rotation, reverse rotation and 2-pitch feeding in combination after the stalement (stopping) of the predetermined saving frequency. In this saving apparatus, the length of the program sheet can be reduced to $\frac{1}{3}$ or less of the length necessary in the conventional saving apparatus using one preset counter circuit, and the effect of saving instructions of the program sheet can be much enhanced over the conventional system using a control card and a disc in combination or the conventional system in which a plurality of preset counters are used and marks corresponding to the respective counters are formed on mark columns of the program sheet.

DETAILED DESCRIPTION OF PREFERRED EMBODIMENT

The present invention will now be described in detail by reference to embodiments illustrated in the accompanying drawing.

Figure 1:
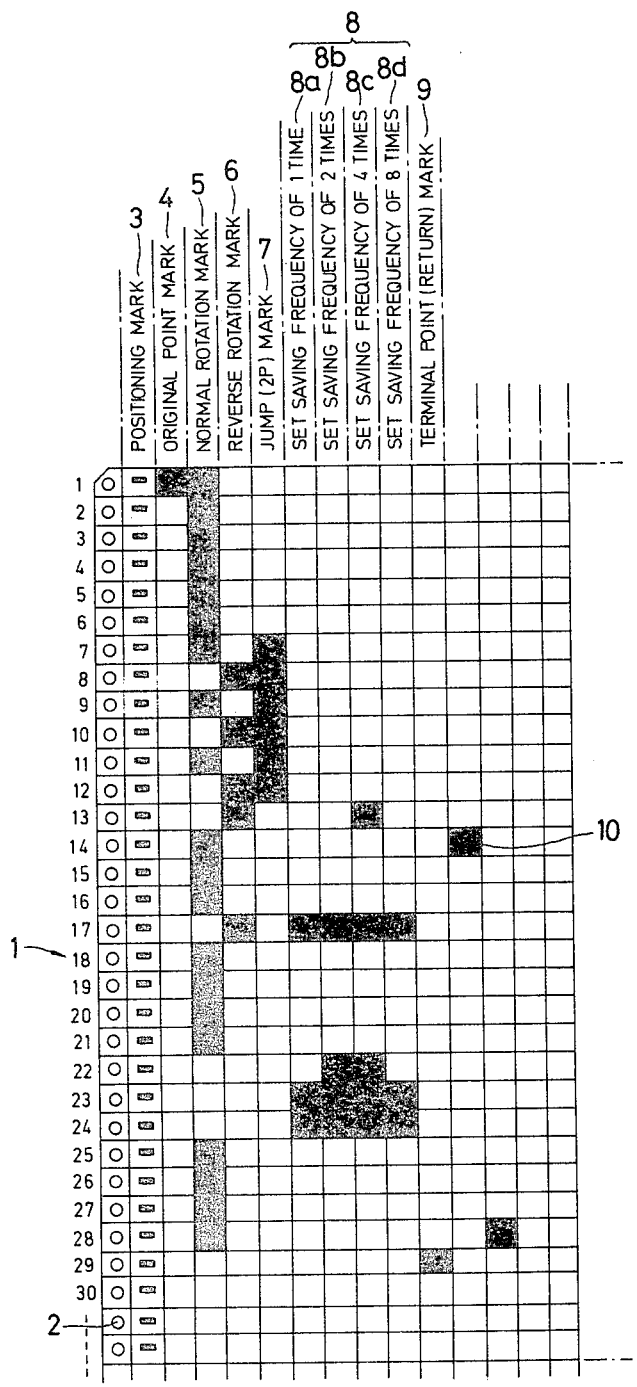
FIG. 1 is a diagram illustrating a program sheet used in the apparatus of the first embodiment of the present invention.
Figure 2:
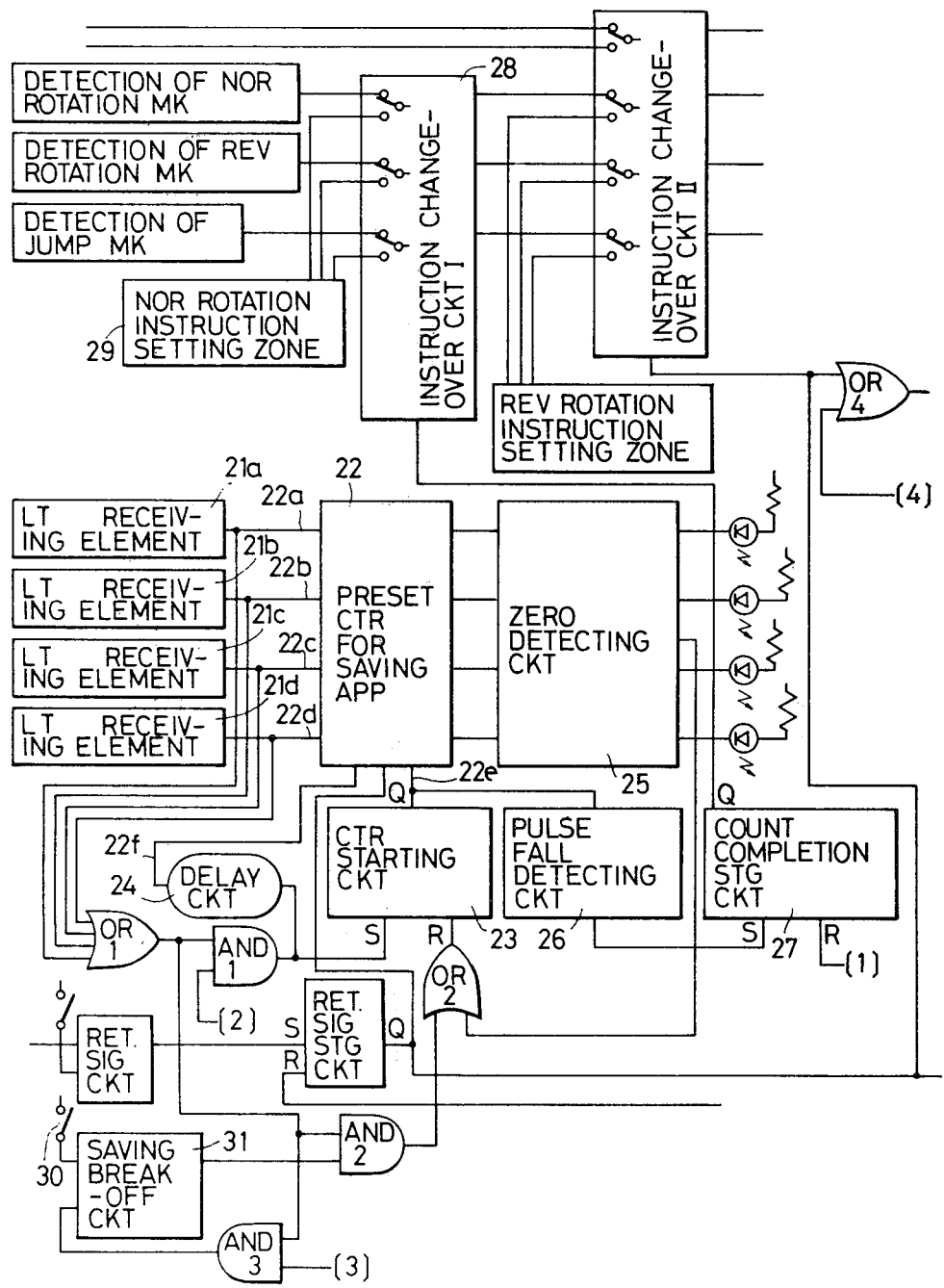
FIG. 2 is a circuit diagram of the apparatus of the first embodiment of the present invention.

FIGS. 1 and 2 illustrate an instruction saving apparatus having one saving cycle according to a first embodiment of the present invention.

Figure 3:
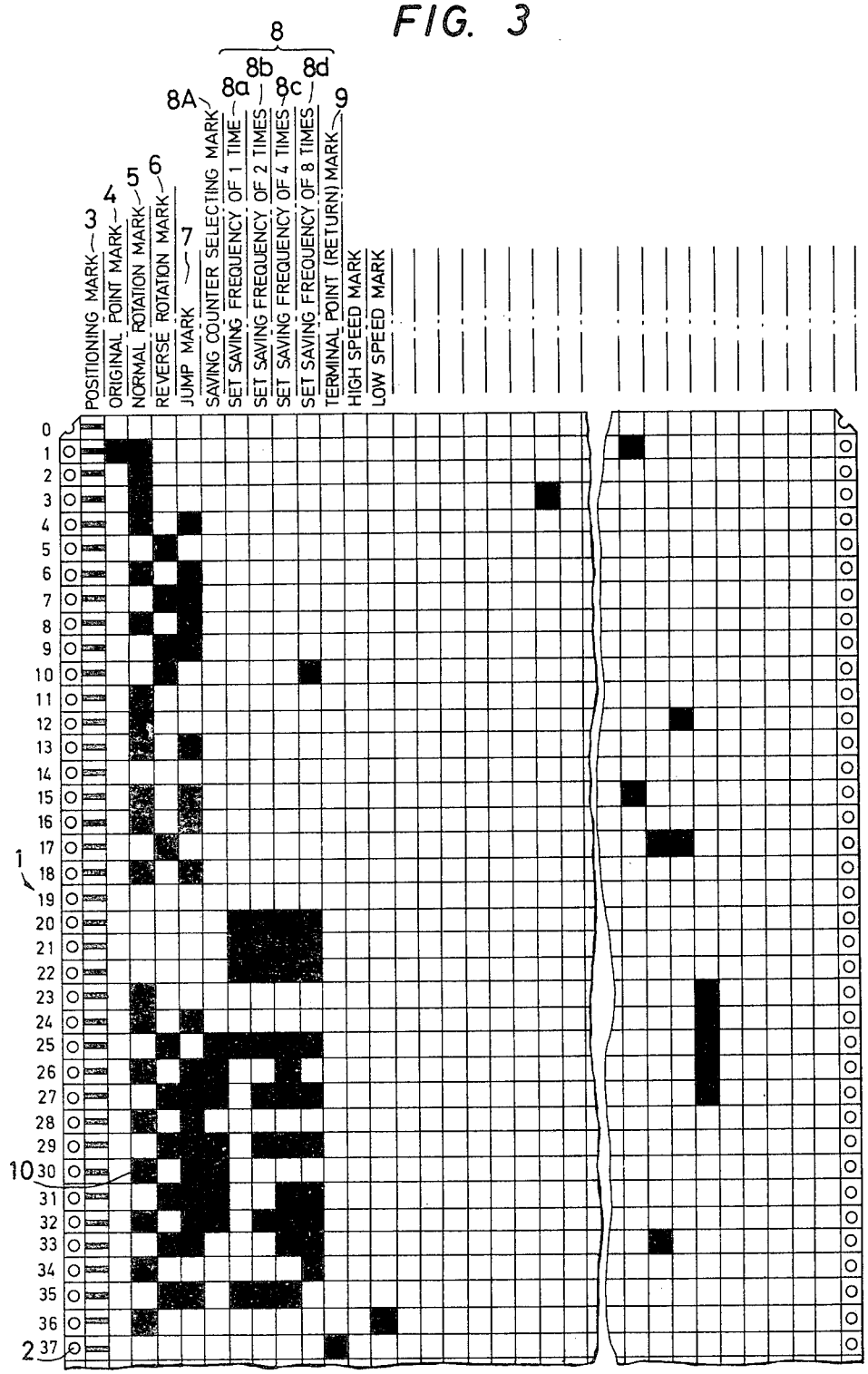
FIG. 3 is a diagram illustrating a program sheet used in the apparatus of the second embodiment of the present invention.
Figure 4A:
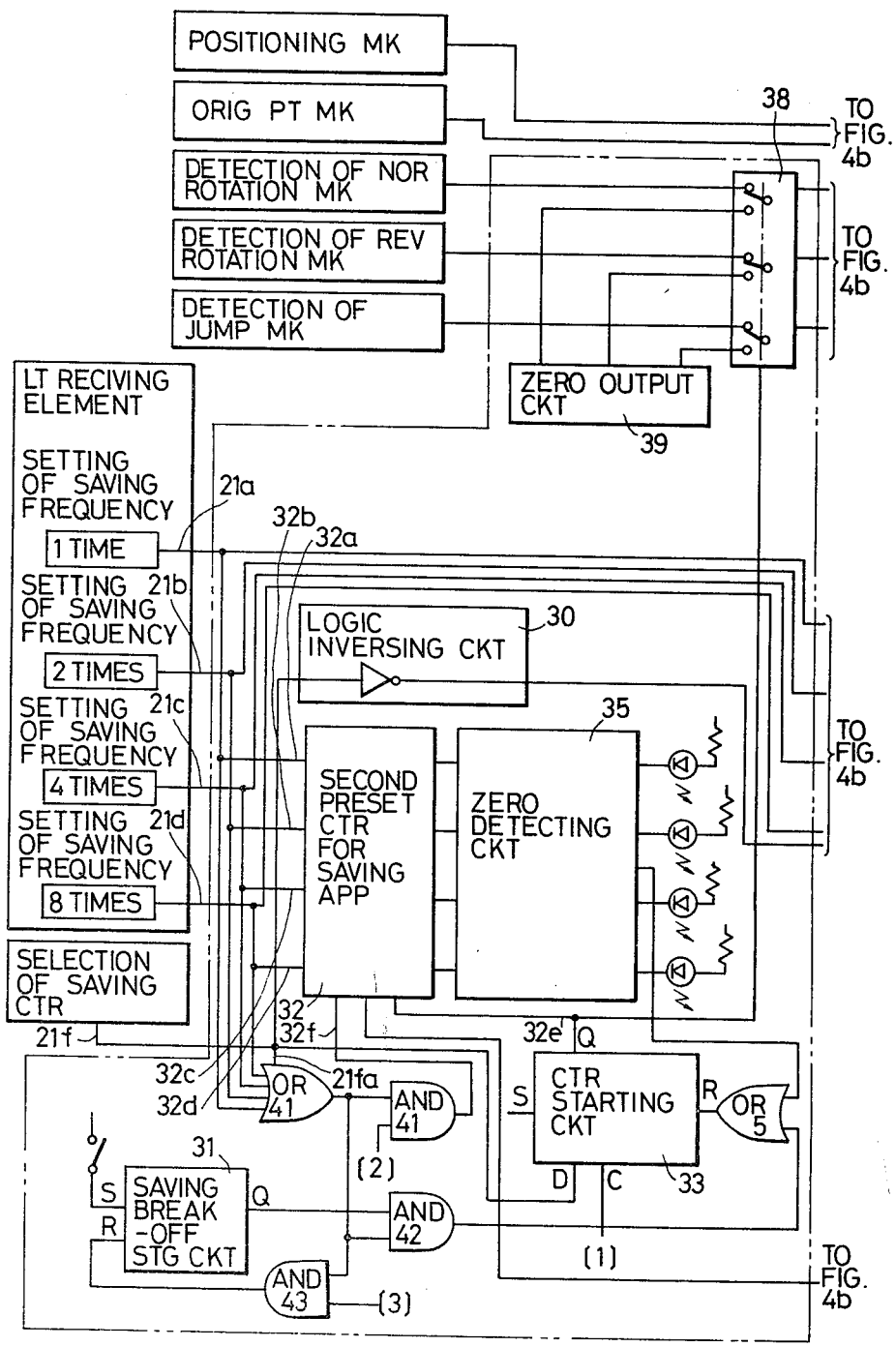
FIGS. 4a, 4b are a circuit diagram of the apparatus of the second embodiment of the present invention.
Figure 4B:
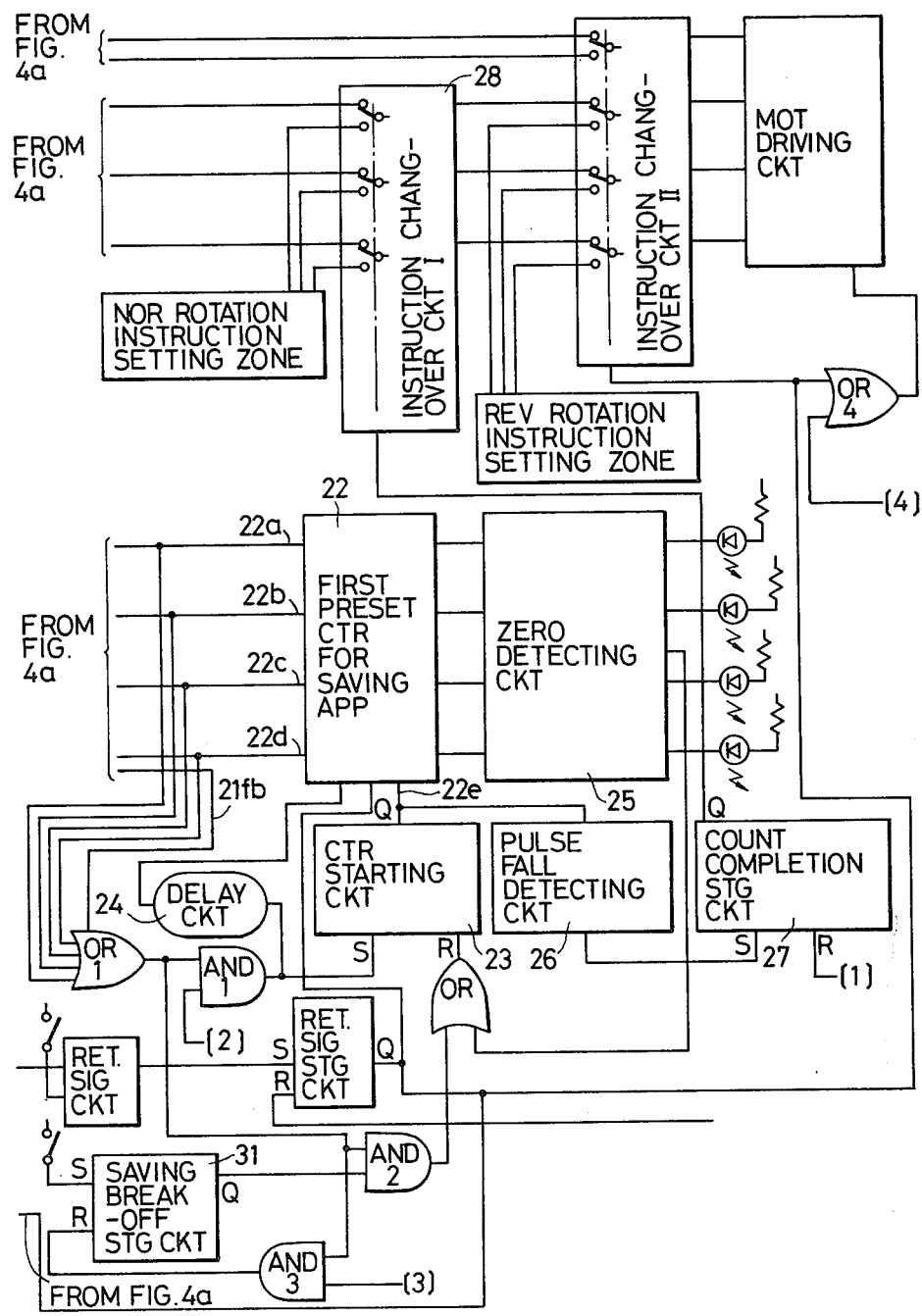

FIGS. 3, 4a and 4b illustrate an instruction saving apparatus having another saving cycle in one saving cycle according to a second embodiment of the present invention.

Referring to FIGS. 1 and 2, a program sheet 1 has perforations 2 on both the sides thereof, and the central portion of the program sheet 1 is longitudinally divided into several rows of regions where marks for giving respective members of a knitting machine instructions as to whether they should be operated or not are formed. More specifically, there are formed columns for positioning marks 3 for determining the stop position of the program sheet, original point marks 4, normal rotation marks 5, reverse rotation marks 6, jump (2 pitches) marks 7, saving frequency setting marks 8, terminal point (return) marks 9 and marks for instructing other operations, such as instructions for high-speed or low-speed driving of the carriage. The saving frequency setting marks 8 include four kinds; namely, mark 8a for the saving frequency of 1 time, mark 8b for the saving frequency of 2 times, mark 8c for the saving frequency of 4 times and mark 8d for the saving frequency of 8 times. Moreover, the program sheet 1 is laterally divided into several regions having a width equal to the interval between every two adjacent perforations 2, and these regions are designated as address 1, address 2, etc. in an order from the first region and marks for instructions to the respective courses at the knitting process are formed in these regions. For example, the longitudinal region 4 is a column in which an original point mark indicating the start position is formed, and this original point mark is given only on the first lateral region, namely the address 1. Incidentally, the address number is different from the course number of a fabric to be knitted. The reason is that if a saving frequency setting mark is formed on a certain address, for example, address 17, knitting of a predetermined number of courses is continuously performed at this address.

Marking of each region is performed by applying a non-transparent material 10 to the predetermined square area of the transparent program sheet. More specifically, a colored sheet having an adhesive applied to one surface thereof is cut into small pieces having a size enough to cover the square area at the predetermined position, and each cut piece is applied to the predetermined position to form a mark 10. Instead of the method using cut pieces of a colored sheet, there may be adopted a method in which the program sheet is covered at predetermined positions with a non-transparent paint to form marks 10. A protecting sheet is piled on the so marked program sheet so that the marks 10 are prevented from falling in contact with members of the saving apparatus or knitting machine.

When the perforation 2 on both the sides of program sheet 1 having the so formed marks 10 are engaged with a sprocket wheel of a verifying apparatus of the knitting machine, the program sheet 1 is introduced into the verifying apparatus. This verifying apparatus includes detecting members for the respective longitudinal regions of the program sheet, and each detecting member comprises a light emitting tube and a light receiving element. When the mark 10 formed on the program sheet 1 arrives at a position interposing between the light emitting tube and light receiving element to intercept the light of the light emitting tube from arriving at the light receiving element, the predetermined operation of the knitting machine is initiated.

For example, the knitting is started from the start position of the original point mark at address 1 and column 4 of the program sheet 1 and is conducted to the point of address 15. Since a mark is formed on the normal rotation mark column of address 15 of the program sheet 1, normal rotation is performed by one pitch. Accordingly, after the knitting operation has been conducted according to instructions on the respective columns (not shown) of address 15, the program sheet is shifted by a distance corresponding to one address and address 16 is verified. Since also the mark on address 16 indicates normal rotation by one pitch, after the knitting operation has been conducted according to instructions on the respective columns (not shown) of address 16, the program is shifted and address 17 is verified. At address 17, a mark is formed on the reverse rotation mark column 6 and reverse rotation by one pitch is instructed, and marks are formed on all the columns 8a, 8b, 8c and 8d of the saving frequency setting marks 8 (saving frequencies of 1 time, two times, 4 times and 8 times, respectively). Accordingly, all the light receiving elements 21a, 21b, 21c and 21d corresponding to the saving frequency setting marks 8a, 8b, 8c and 8d verified and detected by the verifying apparatus hold data inputs 22a, 22b, 22c and 22d of the preset counter 22 for the saving apparatus at high potential levels. In the present embodiment, since the values of saving frequencies set at marks 8a, 8b, 8c and 8d are 1 time, 2 times, 4 times and 8 times, respectively, as described hereinafter, the total saving frequency is 15 times. Signals emitted on detection by the light receiving elements 21a, 21b, 21c and 21d are put in an OR circuit OR1, and the output of this OR circuit is put in an AND circuit AND1 as one of inputs thereof.

Pulse signals [1], [2], [3], [4] and [5] are sequentially generated when the carriage of the knitting machine comes close to the end portion of the knitting machine while the carriage is moved. The signal [2] from this sequential pulse generating circuit is put in the AND circuit AND1 as another input thereof, and it is then put in the setting side of a counter starting circuit 23 to maintain zn output Q at high level. Since a counter starting terminal 22e is turned to a high level, the preset counter 22 presets in the interior thereof the data of 15 times just before the above change as the instructed frequency. The output of the AND circuit AND1 passes through a delay circuit 24 and is given as a counting signal to a counting terminal 22f of the preset counter 22. Since the frequency of 15 times has already been set at the counter and it is in the counting state, the frequency of 14 times (1 time is subtracted from 15 times) is displayed by a photo-diode or the like.

A sufficient time for the foregoing operation is secured by the signal [2] from the sequential pulse generating circuit. The signal [3] and then the signal [4] are given to the designated circuits, and the program sheet 1 is returned to address 16 from address 17 by instructions of one-pitch reverse rotation given by the mark on the reverse rotation mark column 6. One-pitch normal rotation is instructed by the mark on the normal rotation mark 5 of address 16, and since the saving frequency is not set at address 16, no output is generated on the OR circuit OR1. Accordingly, no signal is put in the counting terminal 22e of the preset counter 22, and one time is not subtracted from the set frequency and the knitting operation of the knitting machine is performed according to instructions of marks on respective columns of address 16 on the program sheet, and then, the program sheet is shifted to address 17. Since marks of the saving frequency of 15 times are given on the respective saving frequency setting mark columns 8 at address 17, on shifting of the program sheet to address 17, an output is generated on the OR circuit OR1 and a rectangular wave is put in the count input and the counter starting circuit 23. At this second put-in operation, however, the input S on the terminal of the counter starting circuit 23 does not change the output Q and the data is not fed again. Accordingly, 1 time is further subtracted from 14 times (one time has already been subtracted from 15 times as described above), and after the knitting operation is conducted according to instructions on the respective mark columns of address 17, the program sheet is returned to address 16 from address 17 by one-pitch reverse rotation instructions. In the foregoing manner, while the program sheet is reciprocatively moved between address 16 and address 17, saving of 15 times primarily set, saving of 14 times, saving of 13 times, etc. are conducted until the level of each of the data outputs 22a, 22b, 22c and 22d becomes zero.

When a zero detecting circuit 25 detects that the difference between the set frequency and the actual saving frequency becomes zero, a signal indicating completion of the saving operations is put in an OR circuit OR2 from the circuit 25, and the OR circuit OR2 transmits a signal to the reset terminal of the counter starting circuit 23. When the circuit 23 receives this signal, the level of the output Q is changed to the low level from the high level (the circuit 23 is reset). At this point, a pulse fall detecting circuit 26 detecting this change from the high level to the low level is actuated to set a counting completion storing circuit 27 which changes over an instruction changeover circuit I 28. In this state, although instructions of the reverse direction by one pitch is given to the program sheet, since signals from the mark side are not transmitted beyond the input terminal of the instruction changeover circuit I 28 (changed over to the side of a normal rotation instructing member 29), the program sheet is rotated in the normal direction by one pitch to address 18 irrespectively of instructions at address 17. Then, the knitting operation of the knitting machine is carried out according to instructions marked on the program sheet.

In the foregoing embodiment, the saving operation is performed 15 times between address 16 and address 17 while the program sheet is reciprocatively moved between address 16 and address 17. When it is desired to break off the saving operation before the set frequency is reached and to advance the program sheet to the subsequent address, a saving break-off switch 30 is depressed to set a saving break-off storage circuit 31 which puts out instructions of break-off of saving to the input side of an AND circuit AND2. Since the output signal of the OR circuit OR1 maintaining only the saving frequency-set address at the high level is put in one input of this circuit AND2, the program sheet is shifted to address 17, and instructions for break-off are not given to the output of the AND circuit AND2 before a signal of the high level appears on the OR circuit OR1, but when the saving frequency setting mark columns 8a, 8b, 8c and 8d are verified and it is detected that frequency saving marks are present, if a signal of the high level appears on the OR circuit OR1, the level of the output of the AND circuit AND2 is changed to the high level and also the level of the OR circuit OR2 is changed to the high level. Accordingly, the counter starting circuit 23 is reset and the pulse fall detecting circuit 26 is actuated to maintain the counting completion storage circuit at the high level and change over the instruction changeover circuit I 28 to the side of the normal rotation instructing member 29. As a result, the program sheet is rotated in the normal direction by one pitch to the subsequent address.

In the foregoing embodiment, if all of the saving frequency setting mark columns 8 (saving frequency of 15 times) are marked at a plurality of continuous addresses of the program sheet 1 and marks for normal rotation or reverse rotation are not formed at these addresses, the program sheet 1 is not moved at one address before the knitting operation is conducted repeatedly at the frequency set at this address, and when the knitting operation is repeated at the set frequency, the program sheet is shifted to the subsequent address where the knitting operation is similarly repeated in the stalemate state. When the difference between the set frequency and the actual operation frequency becomes zero, the program sheet is rotated in the normal direction by one pitch to the subsequent address. Accordingly, in this embodiment, it is possible to increase the saving frequency to the infinity by thus forming marks on 4 saving frequency setting mark columns.

In the foregoing embodiment using one preset counter for the saving apparatus, the program sheet can be made shorter than in the conventional systems, but it is impossible to shorten the program within the saving cycle. More specifically, in FIG. 1, a program loop of the saving frequency of 4 times in formed among addresses 6 to 13, but if it is desired to perform saving of another frequency in this loop including addresses 6 to 13, this desire cannot be fulfilled so far as one circuit of the saving preset counter 23 alone is used. For example, then the saving frequency of 8 times is set at address 10, the output Q of the counter starting circuit in the preset counter 22 is held at the high level at address 13 and the frequency is set in the preset counter. Accordingly, even if the saving frequency of 8 times is set at address 10, saving is not performed 8 times, but the signal passes through the delay circuit 24 and is regarded only as the signal of the terminal 22f, that is, the count input signal. Therefore, setting of the saving frequency among addresses 14 to 6 becomes random. In order to eliminate this disadvantege, a second preset counter for the saving apparatus is additionally disposed in the second embodiment of the present invention. Namely, the second embodiment of the present invention is characterized in that a second preset counter circuit for the saving apparatus is additionally disposed as shown in FIGS. 4a, 4b. For disposition of the additional preset counter circuit, an external control terminal 21fb is formed on the OR circuit OR1, and a saving counter selecting column is formed on the program sheet so that marks for operating two counter circuits for the saving apparatus are formed on this column.

Referring to FIG. 3, the knitting operation is started from the start position indicated by the original point mark at address 1, and the knitting operation is conducted to, for example, address 10. At address 10 of the program sheet, a mark is formed on the reverse rotation mark column and the column 8d of the saving frequency of 8 times is marked among the saving frequency setting mark columns 8. Accordingly, when address 10 of the program sheet is verified by the verifying apparatus and the light receiving element 21d corresponding to the column 8d of the saving frequency of 8 times detects the presence of the mark at the column 8d, the input 22d and 32d of preset counters 22 and 32 for the saving apparatus are set at the high level by the output of the light receiving element 21d. The signal of the light receiving element generated on detection of the mark at the column 8d is put in OR circuits OR1 and OR41. External control terminals 21fb and 21fa of the OR circuits OR1 and OR41 will now be described. As pointed out hereinbefore, each OR circuit can emit an output if any one of the inputs is at the high level. These terminals 21fb and 21fa are arranged so that if the input of any one of these terminals 21fa is at the high level, the outputs are not held at the high level.

Control terminals 21fb and 21fa which are external terminals have such a function that when they are held at the high level, the levels of the OR circuits are changed to the low levels irrespectively of the inputs to the OR circuits.

Since no mark is formed on the column 8A of address 10, if the output of a logic inversing circuit 30 shown in FIG. 4 is at the high level and the terminal 21fb is at the high level, an output is generated only on the OR circuit OR1, and the preset counter 22 for the saving apparatus starts the circuit operation to perform saving at the predetermined frequency in a saving loop among addresses 10 through 4 and addresses 4 through 10. After completion of this saving, the program sheet is shifted to address 11 and the predetermined knitting operation is performed. Thus, the program sheet is moved through addresses 11, 12, ... and 23 while the knitting operation is performed according to instructions on mark columns of each address. Since only a mark for the normal rotation is formed at address 23, the program sheet is shifted by one pitch to address 24 after completion of the knitting operation. Since the mark on address 24 indicates two-pitch normal rotation, the program sheet is shifted to address 26 after completion of the knitting operation. The marks on address 26 indicate two-pitch normal rotation, selection of the saving counter and saving frequency 8c of 4 times. On detection of the saving frequency 8c of 4 times by verification, the corresponding light receiving element 21c sets the data inputs 32c and 22c of the second and first saving preset counters 32 and 22 at the high level, and the signal of the data input 21c on detection is put in the OR circuits OR41 and OR1. It is determined by the signal 21fa or 21fb of the light receiving element 21f on detection of the content of the saving counter selecting column 8A on which of the two OR circuits OR41 and OR1 the output is generated. In the embodiment shown in FIG. 3, a mark is formed on the column 8A, the output is generated only on the OR circuit OR41. Since no high level is generated on the OR circuit OR1, the delay circuit 24 and starting circuit 23 are not actuated, and therefore, the preset counter 22 is not actuated. Pulse signals [1], [3], [4] and [5] are sequentially generated when the carriage comes close to the end portion of the knitting machine. The signal [1] from this pulse generating circuit is transmitted to a terminal C of the counter starting circuit 33. At this point, the terminal D of the counter starting circuit 33 is held at the high level as well as the signal 21fa, and the high level on this terminal D is applied to the terminal C of the counter starting circuit 33. At the rising portion of the pulse signal [1], this pulse signal is read in the counter starting circuit 33 and the output Q is held at the high level. Since a counter starting terminal 32e is turned to the high level, the second preset counter 32 for the saving apparatus presets in the interior thereof the data of 4 times just before the above change as the instructed frequency. Since the high level output signal of the output Q of the counter starting circuit changes over an instruction changeover circuit 38 to the side of the zero output circuit, instructions of marks of normal rotation, reverse rotation and jump are not transmitted beyond the input of the circuit but are transmitted to the zero output circuit. The high level of the OR circuit OR41 is applied to the input terminal of the AND circuit AND41, and it is put out as s high level pulse on the input terminal 32 of the preset counter 32 by the signal [2] on the other input terminal of the AND circuit AND41. This pulse subtracts 1 time from the set frequency of 4 times in the preset counter 32 which has already been kept in the counting state by the signal of the sequential pulse [1]. Then, the sequential pulses [3] and [4] are similarly applied, and the signal of the pulse [4] is passed through the OR circuit OR4 and put in a motor driving circuit. However, since the zero output circuit 39 is connected, the program sheet is not rotated in the normal direction or in the reverse direction but is stopped at address 26. When the carriage comes close to the end of the knitting machine again, the sequential pulse [1] is applied to the circuit 33, and the output thereof is maintained at the high level. If the high level is continuously maintained on the terminal 32e of the preset counter 32, no new data is accepted. Accordingly, the high level signal is applied to the terminal 32f by the sequential pulse [2], and 1 time is further subtracted from 3 times (1 time has been subtracted from 4 times). The foregoing procedures are repeated until the set frequency value is reduced to zero. When the zero detecting circuit 35 detects that the difference between the set frequency and the actual saving frequency becomes zero, the signal of completion of the saving operation of the predetermined frequency is put out to an OR circuit OR5. The OR circuit OR5 puts out a signal to a reset terminal R of the counter starting circuit to change the level of the output Q to the low level from the high level (the counter starting circuit is rest). When the level of the output Q of the counter starting circuit is changed to the low level, the instruction changeover circuit 38 changes over the circuit to the side of the mark columns from the side of the zero output circuit 39. Then, the sequential pulse [4] passes through the OR circuit OR4 and starts the motor driving circuit. At this point, 2-pitch normal rotation instructions stored at address 26 are given as the driving instructions, and the program sheet is shifted to address 28 from address 26. After completion of the knitting operation at address 28, by 2-pitch normal rotation, the program sheet is shifted to address 30 and then to address 32. At address 32, saving is conducted 14 times by the same circuit operations as at address 26, and then, the program sheet is shifted to address 34 where saving is conducted 8 times in the same manner as at address 10. Then, the program sheet is shifted to address 35. Marks of 2-pitch reverse rotation and saving frequency of 7 times are formed at address 35. Signal of light receiving elements 21a, 21b and 21c generated on detection of the mark of the saving frequency of 7 times are given to the inputs of the preset counters 22 and 32 so that these inputs are maintained at the high level at the predetermined frequency. However, the saving counters are arranged by the actions of 21fb and 21fa so that only the output of the OR circuit OR1 is held at the high level, and the output of this circuit OR1 is applied to the AND circuit AND1 as one input thereof.

A pulse of the high level is generated on the output side of the AND circuit AND1 by the pulse [2] among the sequential pulses [1], [2], [3], [4] and [5] to actuate the counter starting circuit 23 to held the output Q at the high level. Since the level of the counter starting terminal 22e of the preset counter 22 is turned to the high level, the preset counter 22 presets in the interior thereof the data of 7 times just before the above change as the instructed frequency. The output of the AND circuit AND1 passes through the delay circuit 24 and is applied as the counting signal to the input terminal of 22f of the preset counter. However, since the counter 22 has already been in the state of counting of the predetermined frequency of 7 times, the frequency of 6 times (1 time is subtracted from 7 times) is displayed by a photo-diode or the like. A sufficient time for the foregoing operation is secured by the sequential pulse [2], and pulse [3] and then pulse [4] are applied to the instructed circuits. Then, the program sheet is rotated in the reverse direction to address 33 by marks of reverse rotation and jump. Marks of 2-pitch reverse rotation and saving frequency of 12 times are formed on address 33. Since the counter selecting terminal 21fa is held at the high level and the counter selecting terminal is held at the low level, instruction of the saving frequency of 12 times are set at the preset counter 32, and saving of 12 times in the stalemate state is performed at address 33. In the preset counter 22, instructions of saving of 6 times set at address 35 (1 time has been subtracted from 7 times) are retained as they are. After saving of 12 times at address 33, the knitting operation is conducted in sequence according to instructions given at addresses 29, 27, 25, 24, 26, 28, 30, 32 and 34, and the program sheet is returned to address 35. Although instructions of saving of 7 times are set at address 35, since there is given no selecting signal, only the output 21fb is held at the high level and an output is generated on the OR circuit OR1 to put a rectangular wave into the counter starting circuit and the count input. At this second put-in operation, however, the input S of the counter starting circuit 23 does not change the output Q and the data is not accepted again. Accordingly, 1 time is further subtracted from 6 times (1 time has already been subtracted from 7 times as described above), and after the knitting operation is conducted according to instructions on the respective mark columns of address 35, the program sheet is shifted to address 33 again. In the foregoing manner, the program sheet is reciprocatively moved among addresses 35 through 24 six times (1 time has been subtracted from 7 times), and saving of the predetermined frequency is performed.

What is claimed is:

1. In an automatic control system for a flat knitting machine where marks formed at predetermined positions of a program sheet fed stepwise by a feed drum of a mark reader are verified by a photo-electric element to emit signals on detection of the marks and perform operations corresponding to the detected marks, an apparatus for saving the program sheet characterized in that a plurality of basic saving frequency setting mark columns, a normal rotation mark column for producing a signal of rotating the feed drum of the mark reader in the normal direction and a reverse rotation mark column for producing a signal of rotating the feed drum of the mark reader in the reverse direction are formed on the program sheet and the mark reader is provided with means for detecting marks formed on the respective columns, means for rotating the feed drum in the normal direction by one step on detection of the normal rotation mark and rotating the feed drum in the reverse direction by one step on detection of the reverse rotation mark, means for rotating the feed drum in the normal direction by one step when the difference between the set value of the saving frequency and the actual saving frequency becomes zero, and means for stopping the program sheet until courses of the number corresponding to the saving frequencies have been knitted when the mark reader reads out marks on the saving frequency setting columns formed on the program sheet.

2. A saving apparatus as set forth in claim 1 wherein said means for rotating the feed drum in the normal direction by one step when the difference between the set value of the saving frequency and the actual saving frequency becomes zero includes first and second saving frequency counters as saving frequency counting means, the second saving frequency counter is means for counting the frequency of a second saving cycle performed within a saving cycle of the first saving frequency counter, and saving frequency counter selecting means is disposed to change over the output of means for detecting the set value of the saving frequency between said first and second saving frequency counters.

3. In an automatic control system for a flat knitting machine, a program sheet saving apparatus having a saving frequency break-off device, which comprises a program sheet to be fed step by step, on which a plurality of basic saving frequency setting mark columns, a normal rotation mark column for producing a signal of rotating the program sheet in the normal direction and a reverse rotation mark column for producing a signal of rotating the program sheet in the reverse direction are formed, a photo-electric element for verifying the respective columns on the program sheet and detecting marks on the respective columns, and means to be actuated on receipt of signals emitted from the photo-electric element on detection of marks to rotate the program sheet in the normal direction by one step on detection of a normal rotation mark, rotate the program sheet in the reverse direction by one step on detection of a reverse rotation mark, rotate the program sheet in the normal direction by one step when the difference between the set value of the saving frequency and the actual saving frequency becomes zero and stop the normal and reverse rotation of the program sheet when the mark on the saving frequency setting columns is read out by the mark reader, said program saving apparatus being characterized in that an output of a saving break-off storage circuit set by the output of a saving frequency break-off switch and an output obtained by detecting the saving frequency setting mark are put in an AND circuit, and the output of said AND circuit is put as the basic input into the means for rotating the program sheet in the normal direction by one step so that when an output is generated on detection of a mark of the saving frequency setting mark column by the photo-electric element, the program sheet is rotated in the normal direction by one step.

4. A saving apparatus as set forth in claim 1 and further including means for advancing the program sheet normally or rotating the program sheet reversely according to the instructions by the marks of normal rotation or by the marks of reverse rotation which are formed on the different columns on the program sheet after the knitting operation for the predetermined number of courses corresponding to the saving frequencies have been accomplished.

* * * * *